350-96.24 SR
XR 3,198,881 CROSS REFERENCE SEARCH ROOM
TX3072R
X2530

Aug. 3, 1965 H. P. KNOCKLEIN 3,198,881

FILM SCANNING TRANSMISSION SYSTEM USING FIBER OPTICS

Filed March 19, 1962 2 Sheets-Sheet 1

INVENTOR
HERMAN P. KNOCKLEIN
BY Leonard H. King
ATTORNEY

3198881
NO OR CLASSIF

FILM SCANNING TRANSMISSION SYSTEM USING FIBER OPTICS

Filed March 19, 1962 2 Sheets-Sheet 2

INVENTOR
HERMAN P. KNOCKLEIN
BY Leonard H. King
ATTORNEY

United States Patent Office 3,198,881
Patented Aug. 3, 1965

3,198,881

FILM SCANNING TRANSMISSION SYSTEM USING FIBER OPTICS

Herman P. Knocklein, Mineola, N.Y., assignor to Avien, Inc., Woodside, N.Y.

Filed Mar. 19, 1962, Ser. No. 180,697
2 Claims. (Cl. 178—6.7)

The present invention relates to an optical scanning device characterized by simplicity and a high degree of resolution and adapted to be used for data transmission. More specifically, this invention relates to the use of fiber optical components in a cathode ray tube for improved scanning means in a data transmission system.

It is envisaged in the present invention to provide means for transmission of a photographic transparency, where compactness and simplicity of the equipment are major considerations as, for example, in airborne applications where a camera and high speed developing system are used in reconnaissance work. The device of the present invention provides means for the rapid transmission of data from the photographic record to a base station, where the transparency can be reproduced with a high degree of resolution and detail, as set forth hereinbelow.

In such a device, the circuitry must be reduced to a minimum and mechanical scanning means eliminated to provide for maximum speed and accuracy. It is also highly desirable that the cathode ray tube be of simple, rugged construction and of minimum dimensions. It is envisaged in the present invention to provide a foreshortened tube wherein the electron beam has the pattern of a circular sweep in the neck portion of the tube, which is then converted to a linear sweep across the face of the tube by novel means, as explained hereinbelow. This permits of a flattened tube construction which will occupy relatively small space. It will be appreciated that this is an important feature, as in airborne applications. Such a tube requires improved light emissive qualities and image resolution in reduced dimensions of the tube face. The present invention provides improved phosphorescence characteristics and high image resolution.

It is a primary object of the present invention to provide high speed scanning means and data transmission means for use with a transparent film, or the like.

It is a further object of the present invention to provide an improved cathode ray tube whereby a circular sweep may be changed to a linear sweep with novel means for elimination of retrace.

Yet a further object of the present invention is to provide a cathode ray tube having high image resolution and improved phosphorescence characteristics.

It is still a further object of the present invention to provide a compact, readily portable transmission assembly characterized by simplified circuitry and rugged construction.

These and other objects and advantages of the present invention will be set forth with further particularity or will become apparent in the following description with the figures appended thereto in which.

Figures 1, 2, 3, 4:
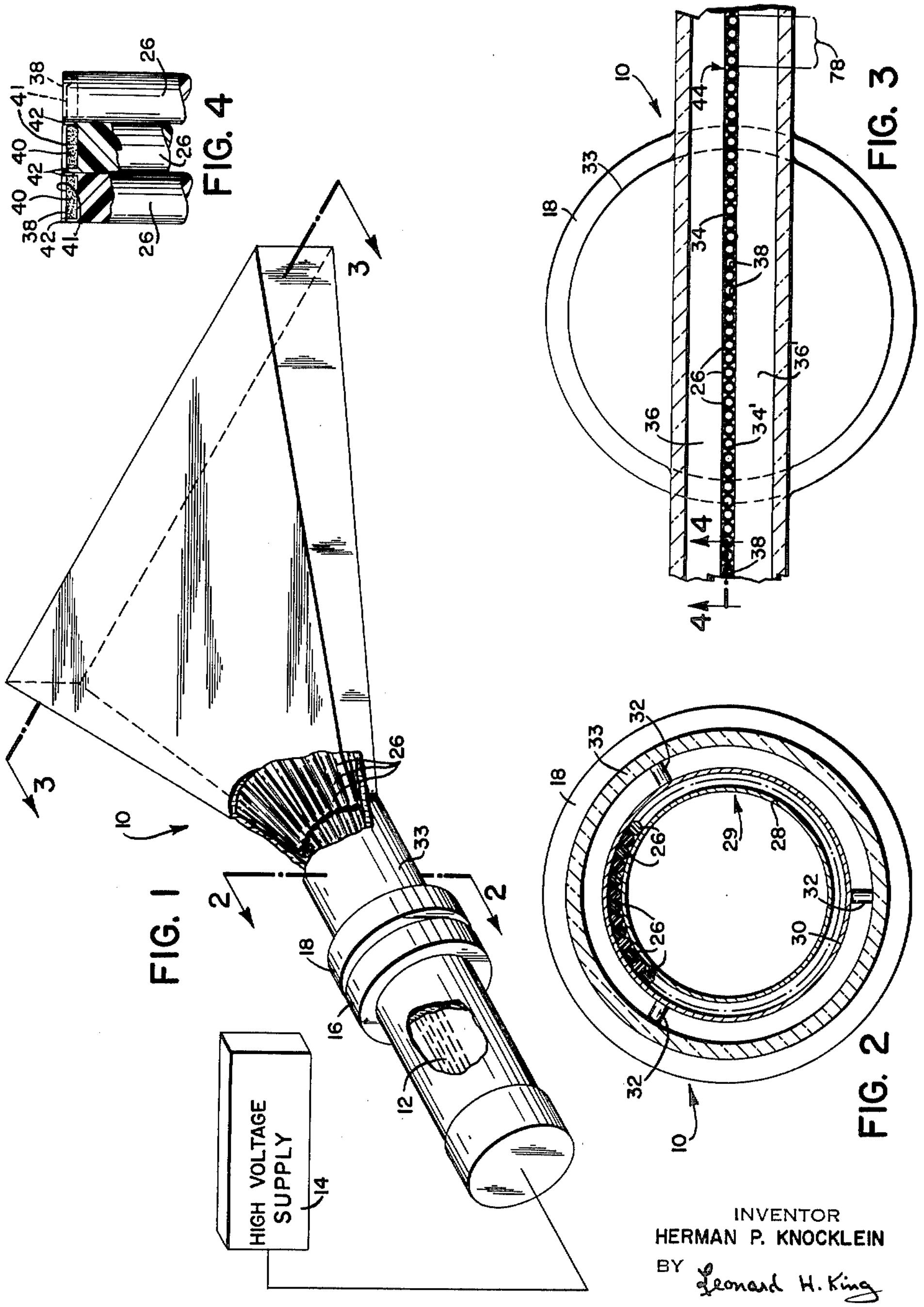
FIG. 1 is a perspective view, partly broken away, of the cathode ray tube used in the device of the present invention.
FIG. 2 is a sectional view of the ring structure perpendicular to the longitudinal axis of the tube, taken along line 2—2 of FIG. 1.
FIG. 3 is an end view of the face plate of the cathode ray tube used, taken along line 3—3 of FIG. 1.
FIG. 4 is an enlarged view of the construction of the optical fibers used in the present invention.

Referring more particularly to the drawings, there is shown in FIG. 1 a simplified representation of the cathode ray tube 10, used in the present invention, wherein an electron beam 12 is generated by conventional means, high voltage source 14 supplying the accelerating potentials. Focusing coils 16 and deflection coil assembly 18, which contains vertical and horizontal sweep coils 18*a* and 18*b*, impart a circular sweep to electron beam 12. This circular scan is formed by means well known in the art, herein indicated by a circuit (FIG. 5) whereby crystal oscillator 20 is coupled to phase shifter 22, providing two outputs 22*a* and 22*b*, 90 degrees out of phase with each other. These are brought to amplifiers 24*a* and 24*b* which are connected to the vertical and horizontal deflection elements 18*a* and 18*b* respectively, within the tube. This circuit provides a circular scan such as is commonly employed in radar and other cathode ray displays. This circular beam scans an annular structure formed of the end portions of a set of optical fibers 26 disposed in the neck portion of the tube (FIG. 1). These are arranged side by side in a circle (FIG. 2) at the neck portion and rearranged in a straight line at the face portion of the tube (FIG. 3). The construction of the tube is shown in FIG. 2, wherein fibers 26 are clamped in a ring assembly 29 comprising inner ring 28 and outer ring 30. The fibers are here shown in greatly enlarged and simplified form. Outer ring 30 is provided with radially extending spacing members 32, for securing the bundle of optical fibers in the neck portion 33 of the tube. As shown in FIG. 3, the other ends of the fibers are oriented and sealed in a straight line between two abutting edges 34–34′ of face plate members 36–36′. The assembly is then inserted into a conventional cathode tube bulb or, alternatively, the bulb may be given a flattened configuration, as shown in FIGS. 1 and 3. Ring assembly 29 should be located proximate to the electron gun to minimize beeam dispersion, thus improving the focusing of the gun. The face plate is sealed within the bulb in the conventional manner. It is not material whether the fibers are maintained in a taut position as only the forward portion need be secured so as to extend to the face of the plate. The tube is then assembled to the gun, the gun inserted in the tube, and the sealing off operation is performed in the conventional manner. It will be appreciated that this construction will provide long, reliable life to the tube, as no moving parts are involved. There are no bandwidth limitations and the resolution of the image is dependent only on the thickness of the fiber used.

As is known in the art, optical fibers are essentially very thin rods of transparent dielectric material. In the visible spectrum, the material is usually some form of glass, and has the valuable property of conducting light with very little dissipation. A light beam impinging at one end of a bundle of optical fibers will be transferred with a high degree of resolution to the other end, with little or no cross-over between closely adjacent fibers within the bundle, thus providing very high resolution of the image impressed at the input end. It is a novel feature of the present invention that an increased light transmitting characteristic is provided for by means of a recess 38 formed by chemical etching in the individual end portions of fibers 26, as shown in FIG. 4. Such chemical etching techniques are well known to the glass art and are, for example, employed for forming decorative reliefs. The semiconductor industry likewise employs such procedures. The use of hydrofluoric acid for this purpose is a common chemistry course experiment and instructions are found in many elementary chemistry textbooks. Recess 38 is filled with phosphor 40 to a height approaching the rim 42 of the individual recess, whereby the phosphor material is confined to an individual fiber and does not overlap to adjacent fibers in the bundle. This construction avoids light spill-over between adjacent fibers and permits of much higher resolution than heretofore obtainable. Conductive coating 41 prevents the accumulation of electrostatic charges on the phosphor.

As shown in FIG. 3, the output portion of the optical bundle has the configuration of a straight line. It will be apparent that the circular sweep has been converted to a linear sweep 44 without the necessity for any flyback or blanking circuits.

Figure 5:
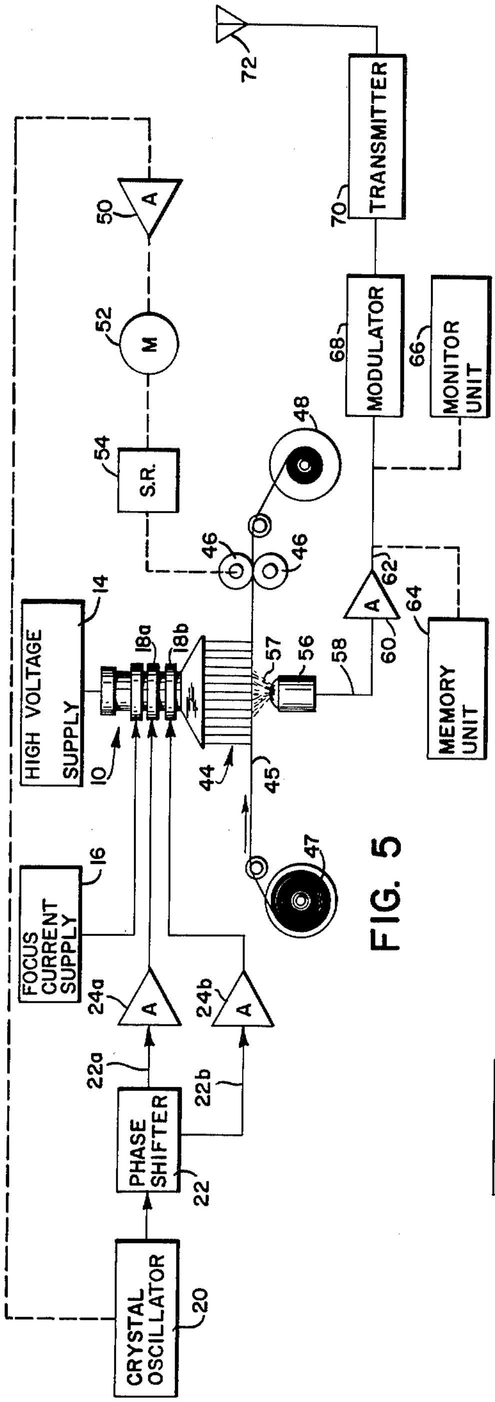
FIG. 5 is a schematic representation of the transmitter used in the present invention.

As shown in FIG. 5, tube 10 is disposed so that linear sweep 44 transversely scans transparency 45 which is passed in front of the tube face by drive rolls 46 which advance the transparency from the supply reel 47 to storage reel 48. This transparency is an exposed and developed film having photographic images or other indicia on each frame. The drive roll rotates at a controlled speed that is set by crystal oscillator 20 which synchronizes power amplifier 50 with the sweep rate of tube 10. Power amplifier 50 drives synchronous motor 52 which, in turn, drives rolls 46 by means of suitable speed reducer 54.

Linear sweep 44 scans transparency 45 and then passes therethrough to photomultiplier 56 which receives the resultant beam as light rays 57 now coded by the image or information on the transparency. Photomultiplier 56 converts these light rays to an electrical signal 58 which is fed to video amplifier 60. This is a wide band amplifier, of a type used in TV circuitry. The output of video amplifier 60 is a signal 62 which may be utilized in various ways. Signal 62 may be fed to a storage tube, as the Hughes memoscope, here indicated as memory unit 64, or else transmitted by direct wire to an information center, here indicated as monitor unit 66. It is contemplated, however, in the present invention to transmit this signal to a distant location, utilizing transmitter circuit means including modulator 68, transmitter 70, and transmitter antenna 72, which emits radio signals.

Figure 6:
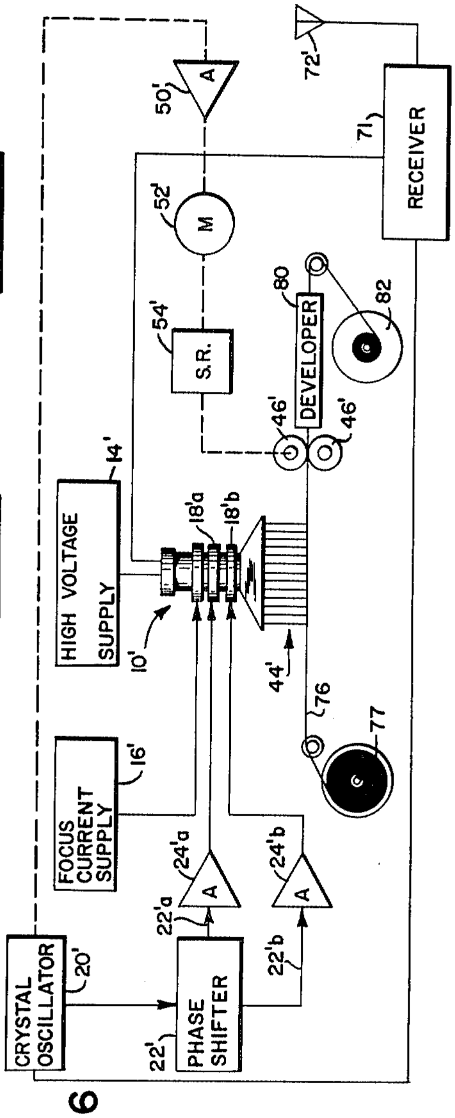
FIG. 6 is a schematic representation of the receiver unit used in the present invention.

Referring now to FIG. 6, there is shown the receiver unit 71 of the present invention, utilizing cathode ray tube 10′ similar to the transmitter tube, whereby a circular sweep formed in the neck portion of tube 10′ is converted to a linear sweep in the face plate of this tube by means of optical fibers disposed as in tube 10. The radio signal is picked up by receiver 71 through its antenna 72′ and is demodulated by means well known in the art, to control the intensity and deflection of the selectron beam in tube 10′ in synchronism with linear scannig beam 44 of tube 10, as coded by trasparency 45 and picked up by photomultiplier 56. Thus, the linear sweep 44′ formed as the output of tube 10′ will be an accurate reproduction of light rays 57, as explained hereinabove.

Linear sweep 44′ scans raw negative film 76 delivered from supply reel 77. It will therefore be appreciated that if the linear scan 44′ is synchronized to that of linear sweep 44 and the speed of film 76 is synchronized to that of transparency 45, then negative film 76 will be exposed to reproduce the original image on transparency 45. This is provided for by synchronization pulses sent out simultaneously with the transmitter signal. This may be conveniently provided for by the use of a portion 78 of optical fibers 26 not utilized in scanning the transparency, as indicated schematically in FIG. 3. The original time base is set by crystal oscillator 20 (FIG. 5), which sets the sweep rate, hence determines when the blank fibers 78 will be scanned. The blank fibers are then used to generate synchronization pulses to time receiver oscillator 20′ (FIG. 6) which sets the speed of rollers 46′ by means of power amplifiers 50′, motor 52′, and speed reducer 54′, similar to the components hereinabove described, and also synchronizes the circular sweep in C.R.T. 10′. This coordinates the speed of driver roll 46′ with the rate of linear beam 44′. It will thus be apparent that modulated beam 44′ will impress an image upon the negative film that will duplicate the original signal received by photomultiplier 56, thus reproducing the image. The raw negative film is transported to developer 80, thence to storage reel 82.

It will be appreciated that the system hereinabove described is characterized by simplicity and compactness to provide a lightweight information transmission system particularly adapted for airborne use.

There has been disclosed heretofore the best embodiment of the invention presently contemplated and it is to be understood that various changes and modifications may be made by those skilled in the art without departing from the spirit of the invention.

It is important that the ends of the fibers form the face plate. You cannot place a conventional face plate over them for the photo image is formed at the end of the fiber. The thickness of the face plate will defocus and require the use of refractive optics to correct it. This is the great disadvantage of the present cathode ray tubes used for this purpose. The ends of the fibers thus form part of the face plate and must be ground to an optical flat.

What is claimed is:

1. A data transmission system for use with transparent film or the like comprising:

a first cathode ray tube provided with deflection coil means adapted to form a circular sweep;

a plurality of optical fibers disposed in side-by-side configuration, one end of said fibers being disposed in the neck portion of said cathode ray tube in circular side-by-side configuration and adapted to be scanned by said circular sweep, the other end of said optical fibers terminating at the face plate of said tube and being unfurled and disposed in linear side-by-side configuration, whereby said circular sweep is converted to a uniform linear sweep characterized by absence of retrace;

first transport means adapted to transport a film transparency having photographic indicia thereon past said tube face plate whereby said transparency is scanned by said linear sweep emanating from said tube face plate;

means to synchronize the speed of said first transport means with said linear sweep means;

a photomultiplier disposed on the opposite side of said transparency in alignment with said linear sweep whereby light beams emanating from said face plate from said linear sweep are adapted to pass through said transparency, said light beams being coded by said indicia formed on said transparency whereby said coded light pattern is adapted to be converted to an intelligence-bearing electrical signal by said photomultiplier;

means to transmit said intelligence-bearing electrical signal as a modulated radio signal;

means to generate a synchronizing signal synchronized to said linear sweep, said means comprising a portion of said plurality of optical fibers of said first cathode ray tube in combination with the linear sweep scanning of said transparency whereby when said sweep scans said portion of said plurality of optical fibers a pulse is generated which is converted by said photomultiplier to a synchronizing signal;

receiver means adapted to receive and demodulate said radio signal and said synchronizing signal;

a second cathode ray tube substantially identical to said first cathode ray tube, said radio signal being operatively connected to the intensity and deflection electrodes of said second tube, said second cathode ray tube being provided with a second deflector coil means adapted to form a second circular sweep;

a second plurality of optical fibers disposed in said second cathode ray tube with one end of said second plurality of fibers being disposed in the neck portion of said second cathode ray tube in circular side-by-side configuration and adapted to be scanned by said second circular sweep, the other end of said second plurality of optical fibers terminating at the face plate of said second tube and being disposed in linear side-by-side configuration whereby said second circular sweep is converted to a second uniform linear sweep characterized by absence of retrace, said second circular sweep being modulated by said received signal to define a second coded light pattern;

second transport means adapted to move unexposed negative film material past said second cathode ray tube, said synchronizing signal being adapted to synchronize the speed of said second transport means with that of said first transport means and to synchronize said second linear sweep with said first linear sweep whereby said raw film is scanned by said second linear sweep to thereby expose said raw film with said coded light pattern in said second sweep; and means to develop said exposed raw film to thereby reproduce said transparency.

2. A device as in claim 1, whereby said first end of said optical fibers in said first and in said second cathode ray tube neck portions are etched to provide an axial recess in said first end portion to define a cup portion and a rim portion, and a light-sensitive phosphor deposited in the cup portion of said recess to a level below that of said rim portion, and a conductive coating on the rim portion.

References Cited by the Examiner

UNITED STATES PATENTS

| | | | |
|---|---|---|---|
| 2,122,750 | 7/38 | Nicolson | 178—6.8 |
| 2,211,066 | 8/40 | Maguire | 178—6.8 |
| 2,967,664 | 1/61 | Ress | 88—1 |
| 2,985,784 | 3/61 | MacNeille | 313—92 |
| 2,996,634 | 8/61 | Woodcock | 313—92 |
| 3,036,153 | 5/62 | Day | 178—6 |

DAVID G. REDINBAUGH, *Primary Examiner.*

ROY LAKE, *Examiner.*